No. 811,314. PATENTED JAN. 30, 1906.
C. E. MUFF.
DRIVING MECHANISM FOR MOTOR VEHICLES.
APPLICATION FILED OCT. 5, 1905.
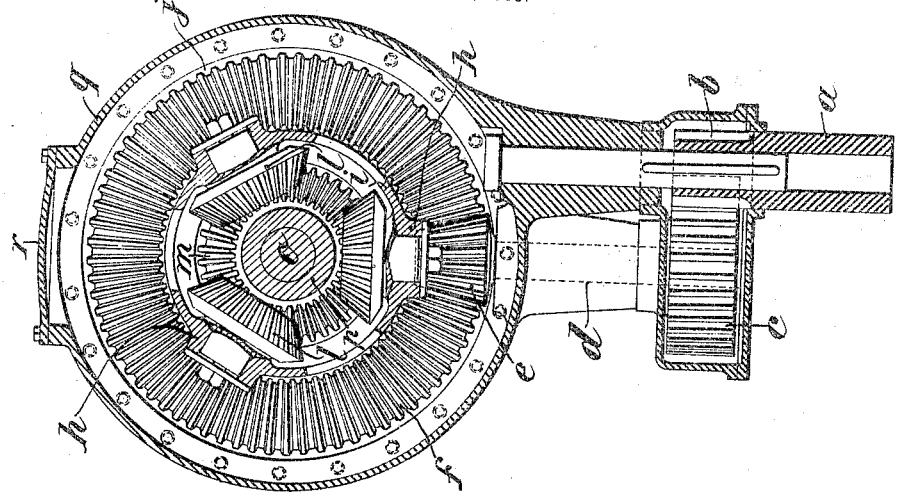
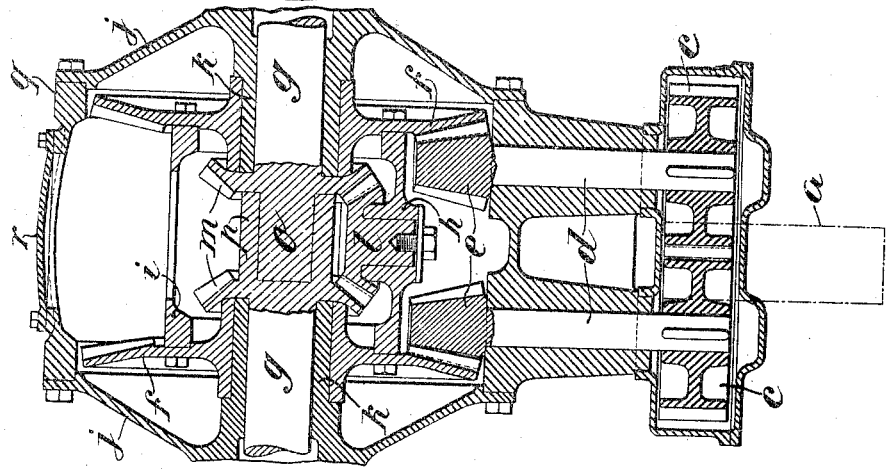
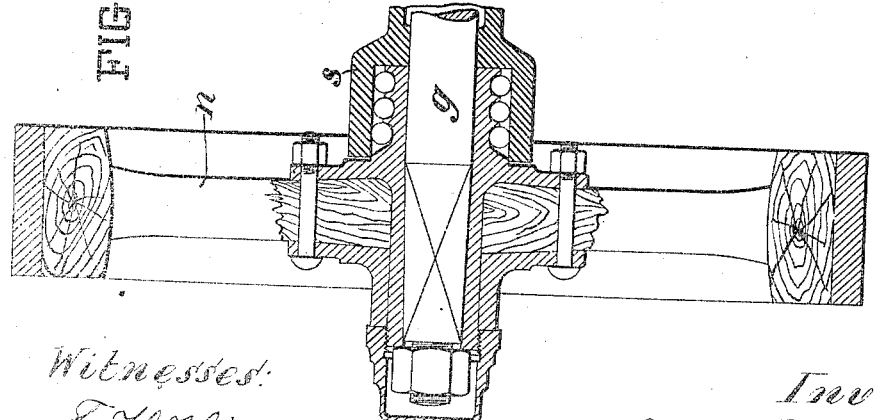
Witnesses:
Inventor:
Charles Emile Muff

UNITED STATES PATENT OFFICE.

CHARLES EMILE MUFF, OF MÜLHAUSEN, GERMANY, ASSIGNOR OF ONE-HALF TO THE FIRM OF ATELIERS DE CONSTRUCTIONS MÉCANIQUES CIDEVANT DUCOMMUN, OF MÜLHAUSEN, ALSACE, GERMANY.

DRIVING MECHANISM FOR MOTOR-VEHICLES.

No. 811,314.      Specification of Letters Patent.      Patented Jan. 30, 1906.

Application filed October 5, 1905. Serial No. 281,499.

*To all whom it may concern:*

Be it known that I, CHARLES EMILE MUFF, a subject of the German Emperor, and a resident of Mülhausen, Alsace, Germany, have invented new and useful Improvements in Driving Mechanism for Motor-Vehicles, of which the following is a complete, clear, and exact specification.

This invention relates to improvements in driving mechanism for motor-vehicles, and particularly for heavy motor-vehicles.

For driving the wheels of heavy motor-vehicles—such, for example, as lorries or wagons, which are mostly fitted with iron tires—it is necessary to provide a mechanism which is as little sensitive as possible to frequent jars or shocks and the separate parts of which, while not occupying a large space, answer to the requirements as to wear and which at the same time permits of the moving parts being completely inclosed as a protection against dust, in such a manner, however, that the said parts can be easily inspected and attended to. Heretofore the driving of motor wagons or lorries has generally been effected by means of chains or like devices, in which case the axle of the driving-wheels is frequently divided, the parts thereof being connected together by differential gear. This mode of driving does not altogether comply with the requirements mentioned above, particularly since, by reason of the separation of the chain drive and the differential gear, the complete driving mechanism occupies a comparatively large space, and only the differential gear is inclosed. Moreover, this type of driving mechanism is not altogether unaffected by constant jars or shocks.

Now the driving mechanism forming the subject of this invention is distinguished from gear of the kind above described in that the differential gear is directly utilized for conveying the driving power—that is to say, for driving purposes—thus enabling the gear to be reduced in dimensions and to be completely located within a casing or box serving for the independent mounting of the separate parts of the gear. Furthermore, by a peculiar construction of the driving mechanism uncompensated axial tooth-pressures are avoided notwithstanding that the power is directly applied to the differential gear. The latter feature is of particular importance, whereby it is necessary that this compensation of the axial pressures may take place without jarring, griping, or incommodating otherwise the differential gear. To this end the differential gear is mounted between two driving bevel-wheels symmetrically arranged with respect to the main wheels of the gear upon the divided driving-axle and with their toothed peripheries opposed to one another, the said bevel-wheels being rigidly connected together by means of an interposed sleeve carrying the planet-wheels of the differential gear and being driven simultaneously upon their inside from a common driving-shaft through the medium of two short secondary shafts with bevel-gearing, the box or case which incloses these parts also serving as a bearing for the same. With this construction no uncompensated axial tooth-pressures are generated in the gearing, as they equilibrate one another in the intermediate part or cover-box carrying the planet-wheels.

In the accompanying drawings, Figure 1 is a longitudinal section of driving mechanism constructed according to the invention, and Fig. 2 is a vertical transverse section thereof.

The main driving-shaft $a$ is provided with a gear-wheel $b$, which meshes with one of the two pinions $c$, and thus drives the two short secondary shafts $d$, each of which has at its extremity a bevel-wheel $e$. Each bevel-wheel $e$ gears with a larger bevel-wheel $f$, the axes of which coincide with that of the divided driving-wheel axle and the toothed peripheries of which are opposed to one another. The bevel-wheels $f$, which constitute the driving members for the differential gear, are rigidly connected together by means of the sleeve $i$, inserted between them and provided with the bosses $h$, and form, with the same, a rigid rotating body which can revolve upon the two bosses $k$, mounted in the casing or box $j$. In the aforesaid bosses $h$ there are mounted the planet-pinions $l$ of the differential gear, each of the larger wheels $m$ of which is integral with one of the parts $g$ of the divided wheel-axle. The driving-wheels are mounted upon the parts $g$ of the axle, one of these wheels being shown in Fig. 1 of the drawings.

By the rotation of the body $f\,i$ on the bosses $k$ the driving-wheels of the vehicle are rotated by the engagement of the pinions $l$ with the wheels *m* of the differential gear through the medium of the axle parts *g*, which are mounted in the bearings *s* and *k*. The two parts *g* of the axle are centered with respect to one another by means of the pin *o* on one part which enters the socket *p* on the other part. The cover *r*, which is fitted to the central part *q* of the box or casing *j*, permits the whole mechanism to be inspected and manipulated with ease, the said mechanism being when in use protected from dust by the box *j q*, which completely incloses it.

From the foregoing description it will be clear that the different rotating parts of the mechanism are mounted in a rigid box or casing independently of one another, so that the parts are little liable to be affected by shocks and jars.

By separating the drive of each of the wheels and by employing the two shafts *d* with the bevel-wheels *e* and the bevel-wheels *f* rigidly connected together it is rendered possible to make use of a large total breadth of tooth without essentially enlarging the outer diameter of the box or casing. The axial tooth-pressure is equilibrated by the rigid interconnection of the bevel-wheels *f*, which are symmetrically arranged with respect to the differential gear, whereby the inward gearing of the bevel-wheels *f* has the effect of causing the axial-pressure compensation to take place from inward to outward, so that this compensation is taken up by the box or casing and the connection sleeve *i*, while the differential gear is withdrawn from all jarring and griping actions. The result of this is that wear is very slight, so that the apparatus has a high efficiency, which it retains for a considerable time, and to this advantage must be added the fact that the whole mechanism may run in an oil-bath in the dust-tight box or casing and can thus be very efficiently lubricated, while being at the same time easily accessible through the cover *r*.

The improved driving-gear, which is especially adapted for use with heavy vehicles, such as lorries or wagons, can also be employed for light vehicles and for omnibuses.

What I claim is—

1. In a driving mechanism for motor-vehicles, the combination with a divided driving-axle, and a differential gear thereon, of two bevel-wheels inclosing the differential gear between them and having their toothed peripheries opposed to one another, an intermediate sleeve rigidly connecting said bevel-wheels and carrying the planet-wheels of the differential gear, two bevel-pinions gearing respectively with said two bevel-wheels and intended to drive simultaneously both the latter, and means for imparting driving motion to both these bevel-pinions, substantially as, and for the purpose, hereinbefore described.

2. In a driving mechanism for motor-vehicles, the combination with a divided driving-axle, and a differential gear thereon, of two bevel-wheels inclosing the differential gear between them and having their toothed peripheries opposed to one another, an intermediate sleeve rigidly connecting said bevel-wheels and carrying the planet-wheels of the differential gear, two bevel-pinions gearing respectively with said two bevel-wheels and intended to drive simultaneously both the latter, two gear-wheels upon short spindles of said bevel-pinions, and a common driving-shaft for driving said gear-wheels and through them both the aforesaid bevel-wheels and differential gear, substantially as, and for the purpose, hereinbefore described.

3. In a driving mechanism for motor-vehicles, the combination with a divided driving-axle, and a differential gear thereon, of two bevel-wheels inclosing the differential gear between them and having their toothed peripheries opposed to one another, an intermediate sleeve rigidly connecting said bevel-wheels and carrying the planet-wheels of the differential gear, two bevel-pinions gearing respectively with said two bevel-wheels and intended to drive simultaneously both the latter, means for imparting driving motion to both these bevel-pinions and a protecting box or casing inclosing all said parts and also serving as a bearing for the same, substantially as, and for the purpose, hereinbefore described.

In witness whereof I have hereunto signed my name, this 23d day of September, 1905, in the presence of two subscribing witnesses.

CHARLES EMILE MUFF.

Witnesses:
GEO. GIFFORD,
AMAND RITTER.